United States Patent
Fenton et al.

(10) Patent No.: US 6,810,690 B2
(45) Date of Patent: Nov. 2, 2004

(54) I.S. GLASS FORMING MACHINE

(75) Inventors: F. Alan Fenton, Granby, CT (US); Jonathan S. Simon, Pleasant Valley, CT (US)

(73) Assignee: Emhart Glass S.A., Cham (CH)

( * ) Notice: Subject to any disclaimer, the term of this patent is extended or adjusted under 35 U.S.C. 154(b) by 498 days.

(21) Appl. No.: 10/005,394

(22) Filed: Dec. 5, 2001

(65) Prior Publication Data

US 2003/0101753 A1 Jun. 5, 2003

(51) Int. Cl.[7] .............................................. C03B 9/41
(52) U.S. Cl. .......................... 65/161; 65/158; 65/301
(58) Field of Search ........................... 65/158, 161, 301

(56) References Cited

U.S. PATENT DOCUMENTS

| | | | | |
|---|---|---|---|---|
| 3,860,407 A | * | 1/1975 | Ferlik | 65/161 |
| 4,108,623 A | * | 8/1978 | Cardenas-Franco | 65/163 |
| 4,338,116 A | * | 7/1982 | Huff et al. | 65/29.1 |
| 4,615,723 A | * | 10/1986 | Rodriguez-Fernandez et al. | 65/163 |
| 4,654,006 A | * | 3/1987 | Kusano et al. | 433/168.1 |
| 5,266,093 A | * | 11/1993 | Konishi et al. | 65/158 |
| 5,512,077 A | * | 4/1996 | Welker | 65/29.18 |
| 5,746,798 A | * | 5/1998 | Menzie | 65/29.12 |
| 6,477,862 B1 | * | 11/2002 | Wacke | 65/29.14 |

FOREIGN PATENT DOCUMENTS

JP          2-263721        * 10/1990

* cited by examiner

Primary Examiner—Sean Vincent
(74) Attorney, Agent, or Firm—Spencer T. Smith

(57) ABSTRACT

An I.S. machine wherein a parison is blown into a bottle in a blow mold. The parison is initially suspended from the neck ring mechanism and the blow molds are displaced to close around the parison below the finish. The neck ring mechanism is displaced away from the mold and a blow head is located on top of the mold to provide final blow. A heat sensor senses when the parison, during reheat has reached the bottom of the mold and supplies a signal to a controller which starts final blow based on the time when this signal was supplied.

5 Claims, 2 Drawing Sheets

I.S. GLASS FORMING MACHINE

The present invention relates to I.S. glass container forming machines and more particularly to the improved control of such machines.

BACKGROUND OF THE INVENTION

In an I.S. machine a gob of molten glass is formed into a parison within a blank mold and the formed parison is transferred to a blow station where blow molds are closed around the parison, a blow head is positioned on top of the blow molds and the parison is blown by applying "final blow". The blown parison is cooled defining a formed bottle that can stand on its own whereupon the blow molds are opened and the bottle is transferred to a dead plate for additional cooling. The time between the closing of the blow molds and the application of final blow is referred to as reheat.

The time when events occur in an I.S. machine are conventionally controlled by an electronic timing drum or sequence controller. Set angles are set by the machine operator for blow molds close, blow head on, and final blow.

OBJECT OF THE INVENTION

It is an object of the present invention to provide an I.S. glass container forming machine which have a better controlled process for forming the bottle in the blow molds.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE PREFERRED EMBODIMENT

Figure 1:
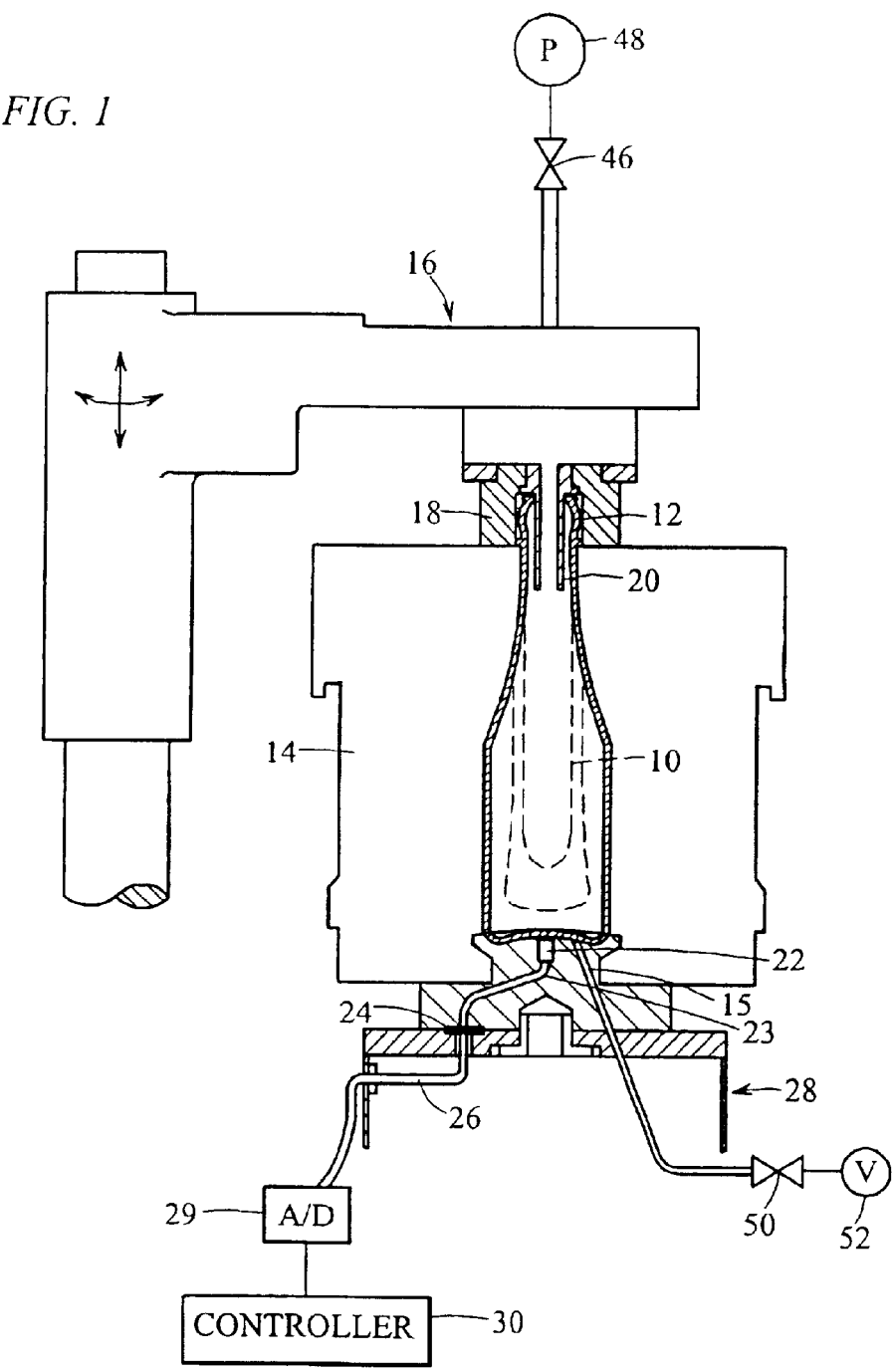
FIG. 1 is a schematic illustration of a blow station of an I.S. machine.

FIG. 1 is a schematic illustration of a blowhead mechanism of an I.S. machine. A parison 10 which has a formed finish (threaded portion) 12 at the top is suspended from the finish 12 by an invert mechanism (not shown). A pair of opposed blow mold halves 14 are displaced from a separated open position to the illustrated closed position supporting the parison just below the finish and engaging a bottom plate 15 to close the bottom of the mold. A blowhead mechanism 16 which supports a blowhead 18, is displaced downwardly and pivotally locating the blowhead around the finish with the blow pipe 20 of the blow head within the parison. As the supported parison reheats, it will, under its own weight stretch downwardly. When the parison reaches the bottom of the mold it will engage the bottom plate 15 and heat transfer to the bottom plate will raise the temperature of the thermocouple 22 which is mounted in the bottom plate. The thermocouple wire 23 connects at a junction 24 to a wire 26 leading from a bottom plate support 28 to an A/D converter 29 which converts the analog voltage to a digital signal that could be processed by a controller 30. When the parison touches the thermocouple, a voltage spike will be generated that can be identified by the controller as a parison touches thermocouple signal.

Figure 2:
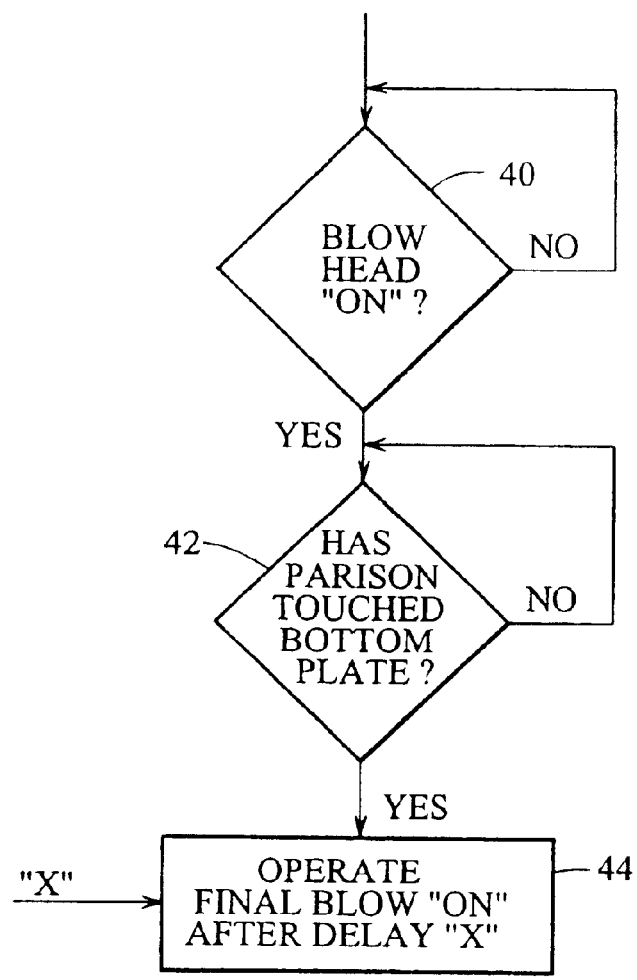
FIG. 2 is a logic diagram showing the operation of the blow station.

FIG. 2 illustrates the logic diagram showing the operation of the control. When the angle on the programmable sequencer reaches a set angle the query is Blowhead On? 40 will be answered in the affirmative and the next query to be answered is Has Parison Touched Bottom Plate? 42. When the touching of the thermocouple by the parison is determined, the control will Operate Final Blow "On" After Delay "X" 44 (the delay is selectable and could be positive, negative, or zero) to blow the parison (a valve 46 controlling flow from a source of pressurized air P/48 will be opened). The rest of the cycle will then follow. While, for purposes of explanation, the blowing of the parison is described by the phrase final blow, it should be understood that this phrase also equates to operating vacuum "on" where the bottle is formed with vacuum rather than with pressure. In this case a valve 50 controlling flow from a source of vacuum V/52 will be opened.

What is claimed is:

1. An I.S. machine including a blow station for forming a bottle from a parison having a formed finish portion comprising a blow station including a blow mold having side and bottom portions for supporting a parison, a source of forming air, valve means for selectively connecting the source of forming air to the blow mold to form the parison into a bottle, heat sensor means for generating a parison at bottom of mold signal, and control means for operating said valve means to connect the source of forming air to the blow mold based on the time when the parison at bottom of mold signal occurs.

2. An I.S. machine according to claim 1, wherein said heat sensor means is a thermocouple.

3. An I. S. machine according to claim 1, wherein said source of forming air is a source of air under pressure.

4. An I.S. machine according to claim 1, wherein said source of forming air is a source of air under a vacuum.

5. An I.S. machine according to claim 1, wherein said control means operates said valve means when the parison at bottom of mold signal occurs plus or minus a selected delay.

* * * * *